US010637671B2

(12) United States Patent
Kaliner

(10) Patent No.: US 10,637,671 B2
(45) Date of Patent: Apr. 28, 2020

(54) SUBSCRIBER IDENTIFICATION SYSTEM

(71) Applicant: Deutsche Telekom AG, Bonn (DE)

(72) Inventor: Stefan Kaliner, Koenigswinter (DE)

(73) Assignee: DEUTSCHE TELEKOM AG, Bonn (DE)

( * ) Notice: Subject to any disclaimer, the term of this patent is extended or adjusted under 35 U.S.C. 154(b) by 190 days.

(21) Appl. No.: 15/697,485

(22) Filed: Sep. 7, 2017

(65) Prior Publication Data

US 2018/0076966 A1 Mar. 15, 2018

(30) Foreign Application Priority Data

Sep. 12, 2016 (EP) .................................. 16188340

(51) Int. Cl.
*H04L 12/06* (2006.01)
*H04L 9/32* (2006.01)
*H04L 29/06* (2006.01)

(52) U.S. Cl.
CPC .............. *H04L 12/06* (2013.01); *H04L 9/321* (2013.01); *H04L 9/3234* (2013.01); *H04L 63/0853* (2013.01); *H04L 2209/127* (2013.01); *H04L 2209/80* (2013.01)

(58) Field of Classification Search
CPC ....... H04L 12/06; H04L 9/3234; H04L 9/321; H04L 63/0853; H04L 2209/80; H04L 2209/127

See application file for complete search history.

(56) References Cited

U.S. PATENT DOCUMENTS

| 5,742,910 | A | * | 4/1998 | Gallant | ................. H04W 8/245 455/558 |
| 5,748,734 | A | * | 5/1998 | Mizikovsky | .......... H04L 9/0869 380/247 |
| 8,571,537 | B2 | * | 10/2013 | Kaliner | ................. H04W 8/265 455/419 |
| 8,675,863 | B2 | * | 3/2014 | Anderson | ............... H04L 63/30 380/1 |
| 9,628,275 | B2 | * | 4/2017 | Lombardi | ........... H04L 63/0428 |

(Continued)

FOREIGN PATENT DOCUMENTS

DE 19527715 A1 2/1997
DE 102008024798 A1 12/2009
(Continued)

*Primary Examiner* — Abu S Sholeman

(74) *Attorney, Agent, or Firm* — Leydig, Voit & Mayer, Ltd.

(57) ABSTRACT

A subscriber identification system for identifying a subscriber in a communications network includes: a first circuit module in which at least a subscriber ID is stored, wherein the first circuit module comprises a first communications interface configured to receive a request signal for the subscriber ID and to transmit the subscriber ID in response to receiving the request signal; and a second circuit module in which at least a cryptographic key is stored, wherein the second circuit module comprises a second communications interface configured to receive an input parameter, wherein the second circuit module is configured to link the input parameter with the cryptographic key to obtain an output parameter, and wherein the second communications interface is configured to transmit the output parameter.

13 Claims, 10 Drawing Sheets

(56) References Cited

U.S. PATENT DOCUMENTS

| | | | | |
|---|---|---|---|---|
| 2006/0288407 A1* | 12/2006 | Naslund | ............... | H04L 9/0844 |
| | | | | 726/9 |
| 2011/0136482 A1* | 6/2011 | Kaliner | ............... | H04W 8/265 |
| | | | | 455/418 |
| 2011/0150211 A1* | 6/2011 | Anderson | ............... | H04L 63/30 |
| | | | | 380/1 |

FOREIGN PATENT DOCUMENTS

| | | |
|---|---|---|
| DE | 102013105727 A1 | 12/2014 |
| DE | 102014105866 A1 | 10/2015 |

* cited by examiner

SUBSCRIBER IDENTIFICATION SYSTEM

CROSS-REFERENCE TO RELATED APPLICATIONS

Priority is claimed to European Patent Application No. EP 16188340.0, filed on Sep. 12, 2016, the entire disclosure of which is hereby incorporated by reference herein.

FIELD

The present invention relates to the field of communications technology, in particular to the field of identifying a subscriber in a communications network.

BACKGROUND

For certain applications, for example in the context of the mobile Internet of Things (mobile IoT), the use of classic SIM cards (subscriber identity module) brings challenges, since classic SIM cards can have limiting framework conditions, for example in terms of costs, installation space and energy consumption.

Due to their demanding production, high security requirements and complex physical handling from a logistics perspective, classic SIM cards are relatively expensive to use in relation to the basic functions they provide. This is particularly the case when the overall price of a communications device is very low, as is expected for future communications devices in the context of the mobile Internet of Things. Communications devices of this kind comprise, for example, sensors and actuators having mobile communications interfaces and simple data transmission modules.

Moreover, communications devices of this kind do not typically have the necessary space to integrate classic SIM cards. Even non-removable SIM card constructions, for example Machine-to-Machine form factor SIM cards, usually require too much space in order to be integrated in such communications devices. Also significant is the energy consumption of classic SIM cards, which may need to be taken into account in these applications, which envisage operation using a single AAA battery cell over a period of five years, for example.

Therefore, classic SIM cards in their currently available forms only appear to be useful in the context of the mobile Internet of Things to a limited extent, owing to their high requirements in terms of cost effectiveness, installation space and energy consumption.

SUMMARY

In an exemplary embodiment, the present invention provides a subscriber identification system for identifying a subscriber in a communications network. The subscriber is assigned a subscriber ID and a cryptographic key. The system includes: a first circuit module in which at least the subscriber ID is stored, wherein the first circuit module comprises a first communications interface configured to receive a request signal for the subscriber ID and to transmit the subscriber ID in response to receiving the request signal; and a second circuit module in which at least the cryptographic key is stored, wherein the second circuit module comprises a second communications interface configured to receive an input parameter, wherein the second circuit module is configured to link the input parameter with the cryptographic key to obtain an output parameter, and wherein the second communications interface is configured to transmit the output parameter.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
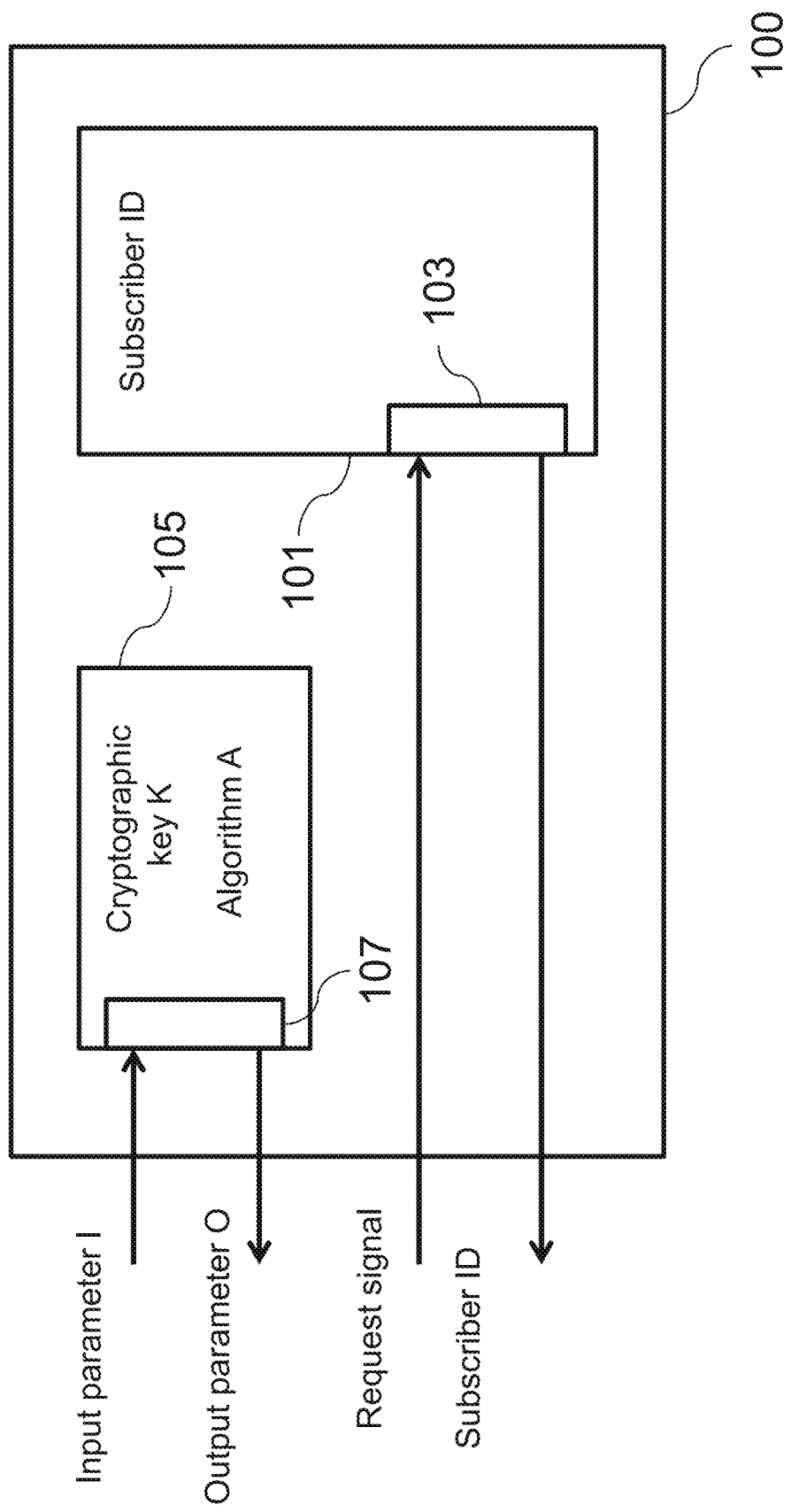
FIG. 1 is a schematic illustration of a subscriber identification system for identifying a subscriber in a communications network.

Exemplary embodiments of the present invention provide an efficient concept for identifying a subscriber in a communications network.

The present invention provides an optimized subscriber identification system for implementing the basic functions of a SIM card, cost-effective integration with the other hardware of a communications device being possible, for example in the form of a system-on-a-chip (SoC). Separating non-critical functions in a first circuit module and critical functions in a second circuit module in terms of data security thus produces an optimized design in which only a very small proportion of critical functions are to be implemented securely. The first circuit module can therefore have less stringent data security requirements than the second circuit module. For example, this enables the first circuit module to be integrated in a third circuit module of the communications device in a simple manner, the third circuit module being able to provide the basic functions of the communications device. When all three modules are completely integrated, greater data security requirements may only be important for the part of the second circuit module.

At the same time, the limited number of critical functions leads to lower potential for data security attacks, a generally lower risk of errors, and simpler and thus more cost-effective testing and certification. The option for integration in the form of a minimal system-on-a-chip (SoC) also overcomes the aforementioned challenges in the context of the mobile Internet of Things, in particular in terms of energy consumption, installation space and cost effectiveness for high volumes.

Therefore, it is possible to produce a modular subscriber identification system (SIS) that is capable of deep integration and enables a subscriber to be identified. The subscriber can also be authenticated.

According to a first aspect, the invention relates to a subscriber identification system for identifying a subscriber in a communications network, the subscriber being assigned a subscriber ID and a cryptographic key. The subscriber identification system comprises a first circuit module in which at least the subscriber ID is stored, the first circuit module comprising a first communications interface configured to receive a request signal for the subscriber ID and to transmit the subscriber ID in response to receiving the request signal. The subscriber identification system further comprises a second circuit module in which at least the cryptographic key is stored, the second circuit module comprising a second communications interface configured to receive an input parameter, the second circuit module being configured to link the input parameter with the cryptographic key using an algorithm in order to obtain an output parameter, and the second communications interface being configured to transmit the output parameter.

For example, the subscriber can be identified using the subscriber ID and authenticated using the input parameter and output parameter.

According to an embodiment, the first circuit module comprises a first non-volatile memory, at least the subscriber ID being stored in the first non-volatile memory, and the second circuit module comprises a second non-volatile memory, at least the cryptographic key being stored in the second non-volatile memory. This provides the advantage that the subscriber ID and the cryptographic key can be stored permanently.

The first non-volatile memory and/or the second non-volatile memory can each be formed by an erasable programmable read-only memory (EPROM).

According to one embodiment, the second circuit module comprises a logic circuit, the logic circuit being configured to link the input parameter with the cryptographic key using the algorithm. This provides the advantage that the output parameter can be determined efficiently on the basis of the input parameter and the algorithm.

The logic circuit can be formed by a programmable logic device (PLD). The logic circuit can also be hard-wired.

According to one embodiment, the second circuit module forms a hardware security module (HSM). This provides the advantage that the second circuit module can make use of functions and properties of a hardware security module that make it difficult to uncover or tamper with the cryptographic key and/or the algorithm.

The second circuit module can protect the cryptographic key and/or the algorithm against software-based and physical attacks, and against side-channel attacks. The second circuit module can be configured to detect attacks or side-channel attacks and to erase the cryptographic key and/or the algorithm in response. The second circuit module can also comprise conductive protective layers in order to prevent undesirable reading of the cryptographic key and/or of the algorithm on the basis of emitted electromagnetic waves. The second circuit module can also be configured to detect irradiated light of a particular wavelength range or unspecified operating states of the second circuit module, and to erase the cryptographic key and/or the algorithm in response. The second circuit module can also use established bus encryption approaches. The second circuit module can also comprise or form a secure cryptoprocessor.

According to one embodiment, the subscriber identification system comprises a trusted platform module (TPM), the trusted platform module (TPM) comprising the second circuit module. This provides the advantage that the second circuit module can be integrated in the trusted platform module (TPM).

According to one embodiment, the subscriber ID is also stored in the second circuit module. This provides the advantage that the assignment of the subscriber ID to the cryptographic key can be ensured in an efficient manner.

According to one embodiment, the subscriber ID is an international mobile subscriber identity (IMSI). This provides the advantage that a standardized form of a subscriber ID can be used.

According to one embodiment, the algorithm is an A3/A8 algorithm, a MILENAGE algorithm or a TUAK algorithm. This provides the advantage that standardized authentication algorithms can be used.

The A3 component of the A3/A8 algorithm can be used for the authentication. The A8 component of the A3/A8 algorithm can be used to generate the key for encrypting the communications. The two components can be executed together, a new key for encrypting the communications being able to be provided in each authentication. The output parameter can be used for both purposes. The MILENAGE algorithm and the TUAK algorithm can also be used for authentication and key generation. The A3/A8 algorithm, the MILENAGE algorithm and the TUAK algorithm can be implemented in accordance with the corresponding ETSI standard or 3GPP standard.

According to one embodiment, the cryptographic key is stored in the second circuit module in a non-readable manner. This provides the advantage that the cryptographic key is cryptographically bound to the second circuit module.

According to a second aspect, the invention relates to a communications device for communicating with an authentication server via a communications network. The communications device comprises a subscriber identification system according to the first aspect of the invention. The communications device further comprises a third circuit module having a third communications interface for communicating with the subscriber identification system and a fourth communications interface for communicating with the authentication server via the communications network. The third communications interface is configured to transmit the request signal to the subscriber identification system and to receive the subscriber ID from the subscriber identification system. The fourth communications interface is configured to transmit the received subscriber ID to the authentication server via the communications network.

The third circuit module can also comprise a processor and additional interfaces of the communications device, for example for interacting with the subscriber.

The authentication server can be a part of an authentication center (AuC) of the communications network.

According to one embodiment, the fourth communications interface is also configured to receive the input parameter from the authentication server via the communications network, the third communications interface also being configured to transmit the input parameter to the subscriber identification system, and to receive the output parameter from the subscriber identification system, and the fourth communications interface further being configured to transmit the output parameter to the authentication server via the communications network. This provides the advantage that the subscriber can be authenticated efficiently.

According to one embodiment, the third circuit module comprises the first circuit module of the subscriber identification system and/or the second circuit module of the subscriber identification system. This provides the advantage that efficient implementation is possible.

According to one embodiment, the first circuit module is arranged in a first integrated circuit. This provides the advantage that the first circuit module can be implemented efficiently.

According to one embodiment, the second circuit module is arranged in a second integrated circuit. This provides the advantage that the second circuit module can be implemented efficiently.

According to one embodiment, the third circuit module can be arranged in a third integrated circuit. This provides the advantage that the third circuit module can be implemented efficiently.

According to one embodiment, the first circuit module is arranged in a first integrated circuit, the second circuit module being arranged in a second integrated circuit, and the third circuit module being arranged in a third integrated circuit. This provides the advantage that the circuit modules can each be implemented separately in an efficient manner.

According to one embodiment, the first circuit module, the second circuit module, and the third circuit module are arranged in a common integrated circuit. This provides the advantage that the circuit modules can be implemented together in an efficient manner.

According to a third aspect, the invention relates to a method for identifying a subscriber in a communications network using a subscriber identification system. The subscriber is assigned a subscriber ID and a cryptographic key. The subscriber identification system comprises a first circuit module having a first communications interface and a second circuit module having a second communications interface, at least the subscriber ID being stored in the first circuit module, and at least the cryptographic key being stored in the second circuit module. The method comprises receiving a request signal for the subscriber ID via the first communications interface, transmitting the subscriber ID via the first communications interface in response to receiving the request signal, receiving an input parameter via the second communications interface, linking the input parameter with the cryptographic key using an algorithm via the second circuit module in order to obtain an output parameter, and transmitting the output parameter via the second communications interface.

The method can be carried out by the subscriber identification system. Additional features of the method result directly from the features or functions of the subscriber identification system.

According to a fourth aspect, the invention relates to a method for communicating with an authentication server via a communications network using a communications device. The communications device comprises a subscriber identification system according to the first aspect of the invention, a third circuit module having a third communications interface for communicating with the subscriber identification system, and a fourth communications interface for communicating with the authentication server via the communications network. The method further comprises transmitting the request signal to the subscriber identification system via the third communications interface, receiving the subscriber ID from the subscriber identification system via the third communications interface, and transmitting the received subscriber ID to the authentication server via the communications network via the fourth communications interface.

The method can be carried out by the communications device. Additional features of the method result directly from the features or functions of the communications device.

According to a fifth aspect, the invention relates to a computer program with a program code for carrying out the method according to the third aspect of the invention or the method according to the fourth aspect of the invention.

The subscriber identification system and/or the communications device can be programmed to execute the program code.

The invention can be implemented in hardware and/or in software.

FIG. 1 is a schematic illustration of a subscriber identification system 100 for identifying a subscriber in a communications network. The subscriber is assigned a subscriber ID and a cryptographic key K.

The subscriber identification system 100 comprises a first circuit module 101 in which at least the subscriber ID is stored, the first circuit module 101 comprising a first communications interface 103 configured to receive a request signal for the subscriber ID and to transmit the subscriber ID in response to receiving the request signal. The subscriber identification system 100 further comprises a second circuit module 105 in which at least the cryptographic key K is stored, the second circuit module 105 comprising a second communications interface 107 configured to receive an input parameter I, the second circuit module 105 being configured to link the input parameter I with the cryptographic key K using an algorithm A in order to obtain an output parameter O, and the second communications interface 107 being configured to transmit the output parameter O.

Figure 2:
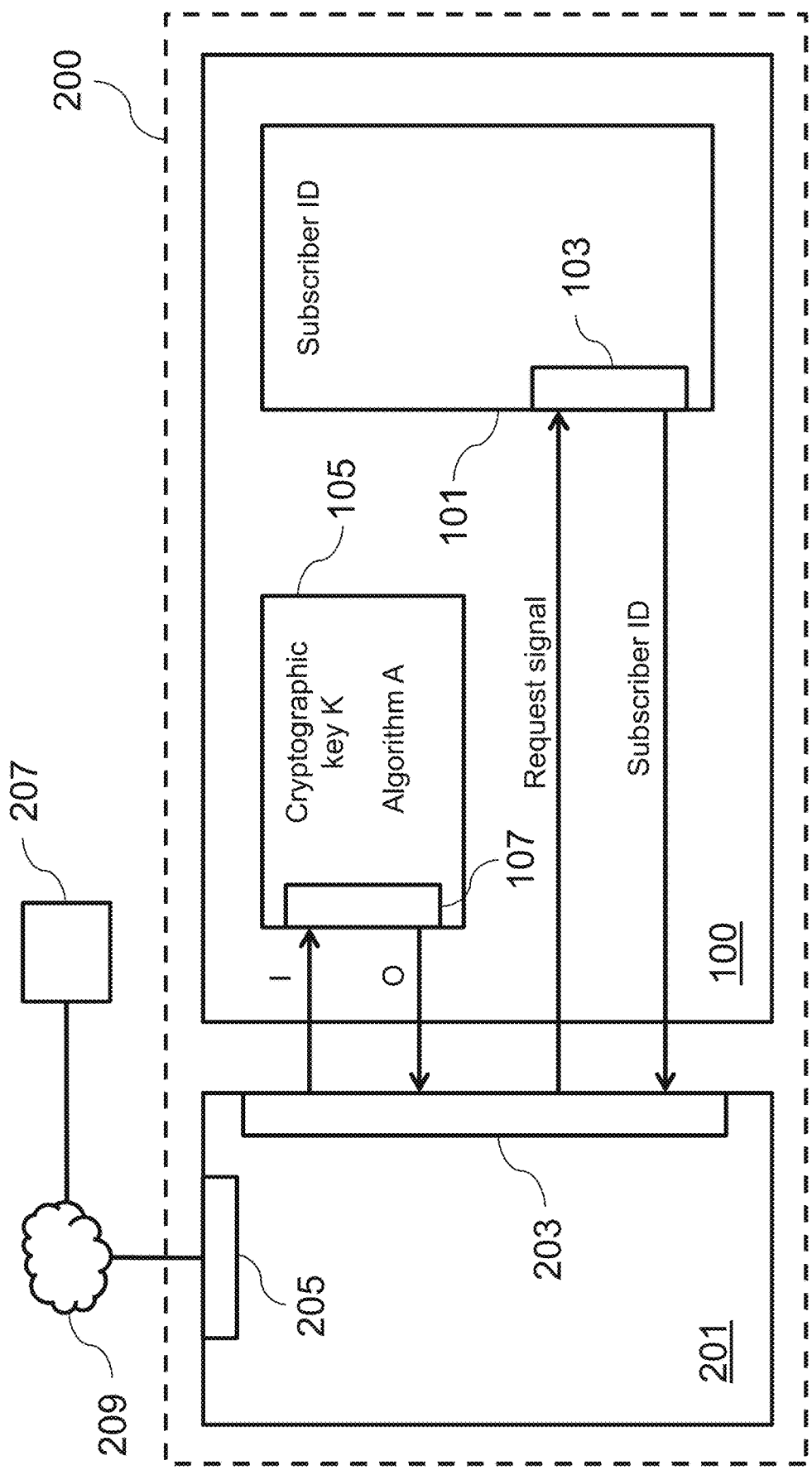
FIG. 2 is a schematic illustration of a communications device for communicating with an authentication server via a communications network.

FIG. 2 is a schematic illustration of a communications device 200 for communicating with an authentication server 207 via a communications network 209. The communications device comprises a subscriber identification system 100 and a third circuit module 201.

The subscriber identification system 100 is used to identify a subscriber in the communications network 209. The subscriber is assigned a subscriber ID and a cryptographic key K.

The subscriber identification system 100 comprises a first circuit module 101 in which at least the subscriber ID is stored, the first circuit module 101 comprising a first communications interface 103 configured to receive a request signal for the subscriber ID and to transmit the subscriber ID in response to receiving the request signal. The subscriber identification system 100 further comprises a second circuit module 105 in which at least the cryptographic key K is stored, the second circuit module 105 comprising a second communications interface 107 configured to receive an input parameter I, the second circuit module 105 configured to link the input parameter I with the cryptographic key K using an algorithm A in order to obtain an output parameter O, and the second communications interface 107 being configured to transmit the output parameter O.

The third circuit module 201 comprises a third communications interface 203 for communicating with the subscriber identification system 100 and a fourth communications interface 205 for communicating with the authentication server 207 via the communications network 209. The third communications interface 203 is configured to transmit the request signal to the subscriber identification system 100 and to receive the subscriber ID from the subscriber identification system 100. The fourth communications interface 205 is configured to transmit the received subscriber ID to the authentication server 207 via the communications network 209. The subscriber can thus be identified by the authentication server 207.

The fourth communications interface 205 is also configured to receive the input parameter I from the authentication server 207 via the communications network 209, the third communications interface 203 also being configured to transmit the input parameter I to the subscriber identification system 100 and to receive the output parameter O from the subscriber identification system 100, and the fourth communications interface 205 also being configured to transmit the output parameter O to the authentication server 207 via the communications network 209. The subscriber can thus be authenticated by the authentication server 207, for example on the basis of a challenge-response approach.

Figure 3:
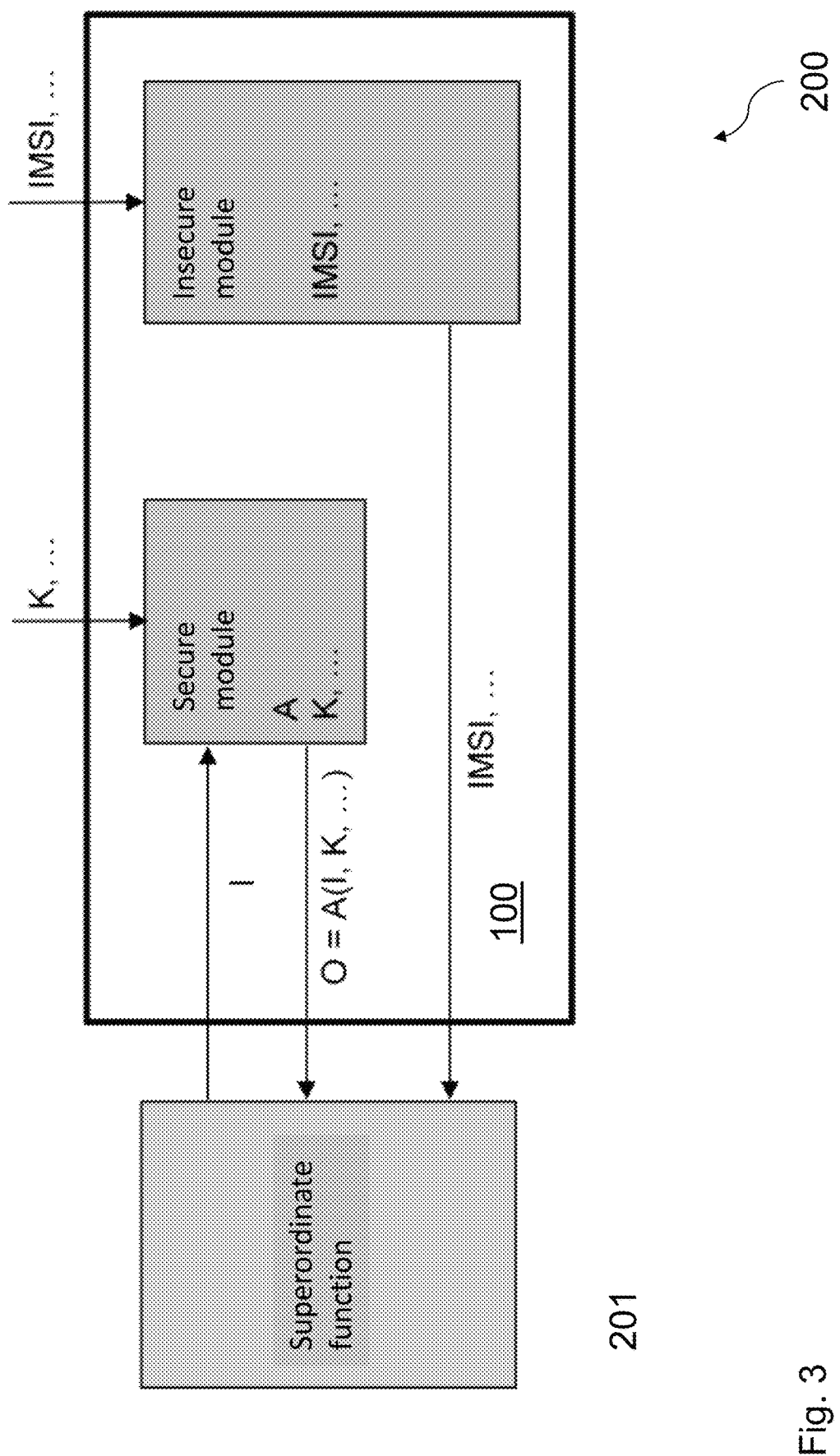
FIG. 3 is a schematic illustration of a communications device for communicating with an authentication server via a communications network.

FIG. 3 is a schematic illustration of a communications device 200 for communicating with an authentication server via a communications network. The communications device 200 shown is a possible embodiment of the communications device 200 of FIG. 2.

The communications device 200 comprises a subscriber identification system 100 having a first circuit module 101, a second circuit module 105, and a third circuit module 201. The first circuit module 101 can be implemented as an insecure module, the second circuit module 105 can be implemented as a secure module, and the third circuit module 201 can carry out a superordinate function of the communications device 200. The subscriber ID is an international mobile subscriber identity (IMSI).

As a result, a two-part subscriber identification system (SIS) 100 can be used, comprising a first circuit module 101 having a non-volatile memory only, and a second circuit module 105 having a non-volatile memory and a programmed logic circuit.

In the simplest case, the second circuit module 105 only contains a cryptographic key K as an authentication key, and an algorithm A. The execution of the algorithm A can be launched externally by transferring an input parameter I, upon which an output parameter O is generated via the secret cryptographic key K, i.e. O=A(I, K). The output parameter O is thus returned without the cryptographic key K or the algorithm A being visible from the outside. The second circuit module 105 is thus only used for executing the algorithm A. The module also contains an additional function of storing the cryptographic key K.

The first circuit module 101 optionally comprises additional relevant data, but in the simplest case only comprises the subscriber ID or IMSI of the subscriber. The data in the first circuit module 101 are not usually critical and can be stored and read from the outside.

The subscriber identification system 100 is assigned to a subscriber relationship or is personalized by storing a combination of the subscriber ID and cryptographic key K. In this case, the cryptographic key K is stored in the second circuit module 105 and the subscriber ID is stored in the first circuit module 101.

To operate the communications device 200, the third circuit module 201 in the form of a superordinate function can access the circuit modules 101, 105, and can, for example, read the subscriber ID from the first circuit module 101 and perform authentication to the communications network 209, for example a mobile communications network, using the second circuit module 105. Overall, the result is the basic functions of a classic SIM card, which, from the point of view of the communications network 209, cannot be distinguished therefrom. The communication device 200 can, for example, be a terminal in the context of the Internet of Things.

According to one embodiment, the first circuit module 101 is logically integrated in the third circuit module 201 in the form of a superordinate function of the communications device 200, for example in a memory of the communications device 200, and the second circuit module 105 is implemented in a processor, for example the main processor of the communications device 200 as a system-on-a-chip (SoC). In this form, the aforementioned advantages can be produced in a particularly beneficial manner. The communications device 200 can thus be implemented as a single-chip system having a common integrated system for the circuit modules 101, 105, 201.

Figure 4:
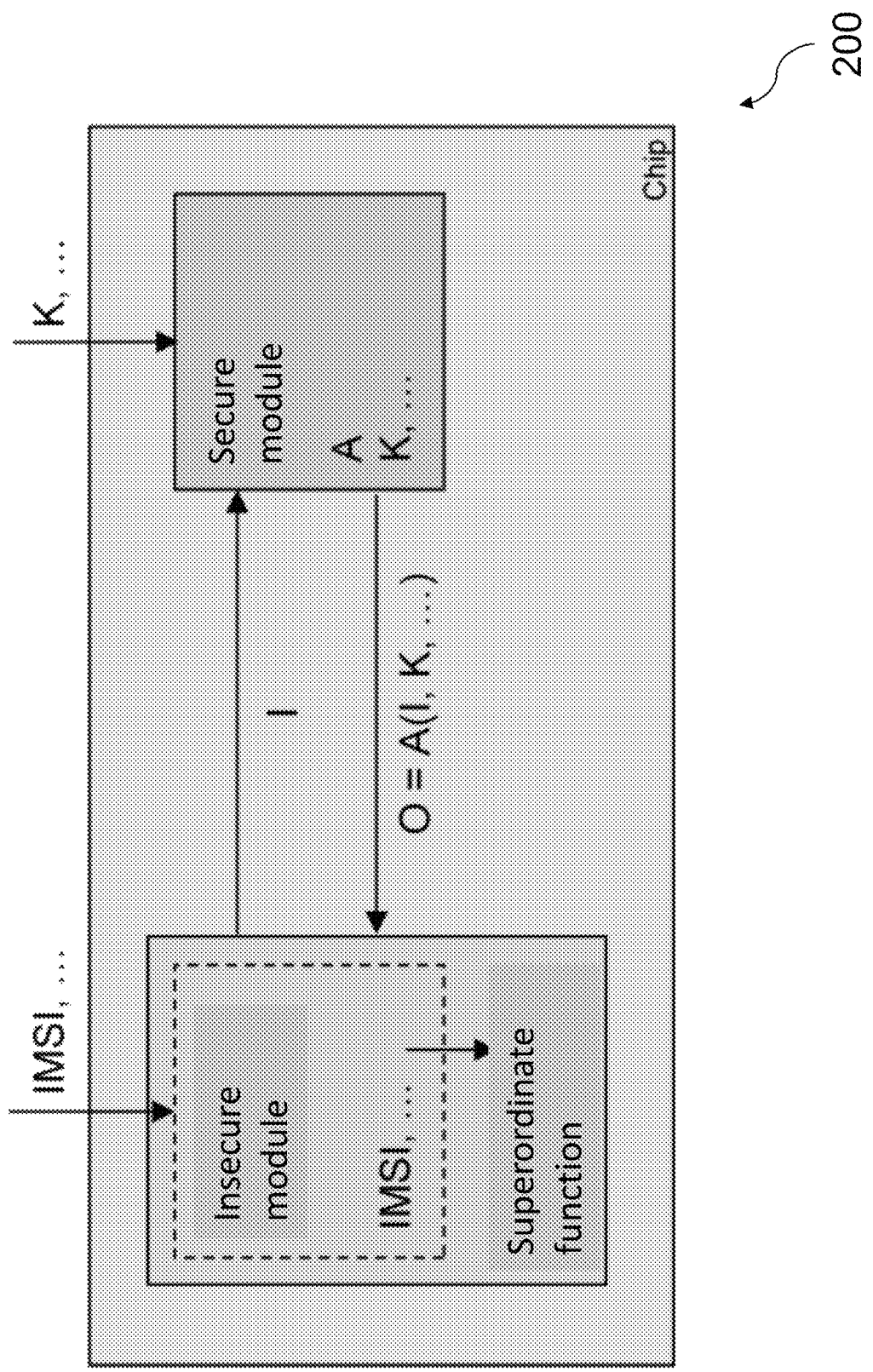
FIG. 4 is a schematic illustration of a communications device for communicating with an authentication server via a communications network.

FIG. 4 is a schematic illustration of a communications device 200 for communicating with an authentication server via a communications network. The communications device 200 shown is a possible embodiment of the communications device 200 of FIG. 2.

The communications device 200 comprises a subscriber identification system having a first circuit module 101, a second circuit module 105, and a third circuit module 201. The first circuit module 101 can be implemented as an insecure module, the second circuit module 105 can be implemented as a secure module, and the third circuit module 201 can carry out a superordinate function of the communications device 200. The subscriber ID is an international mobile subscriber identity (IMSI).

The first circuit module 101 and the second circuit module 105 are arranged on the same integrated circuit (chip). The first circuit module 101 is integrated in the third circuit module 201 in the form of a superordinate function.

The first circuit module 101 is thus integrated in the third circuit module 201 in the form of a superordinate function, and is contained in a common integrated circuit with the second circuit module 105 as a system-on-a-chip. This embodiment can be particularly advantageous in terms of a cost-effective, compact and energy-saving solution.

Figure 5:
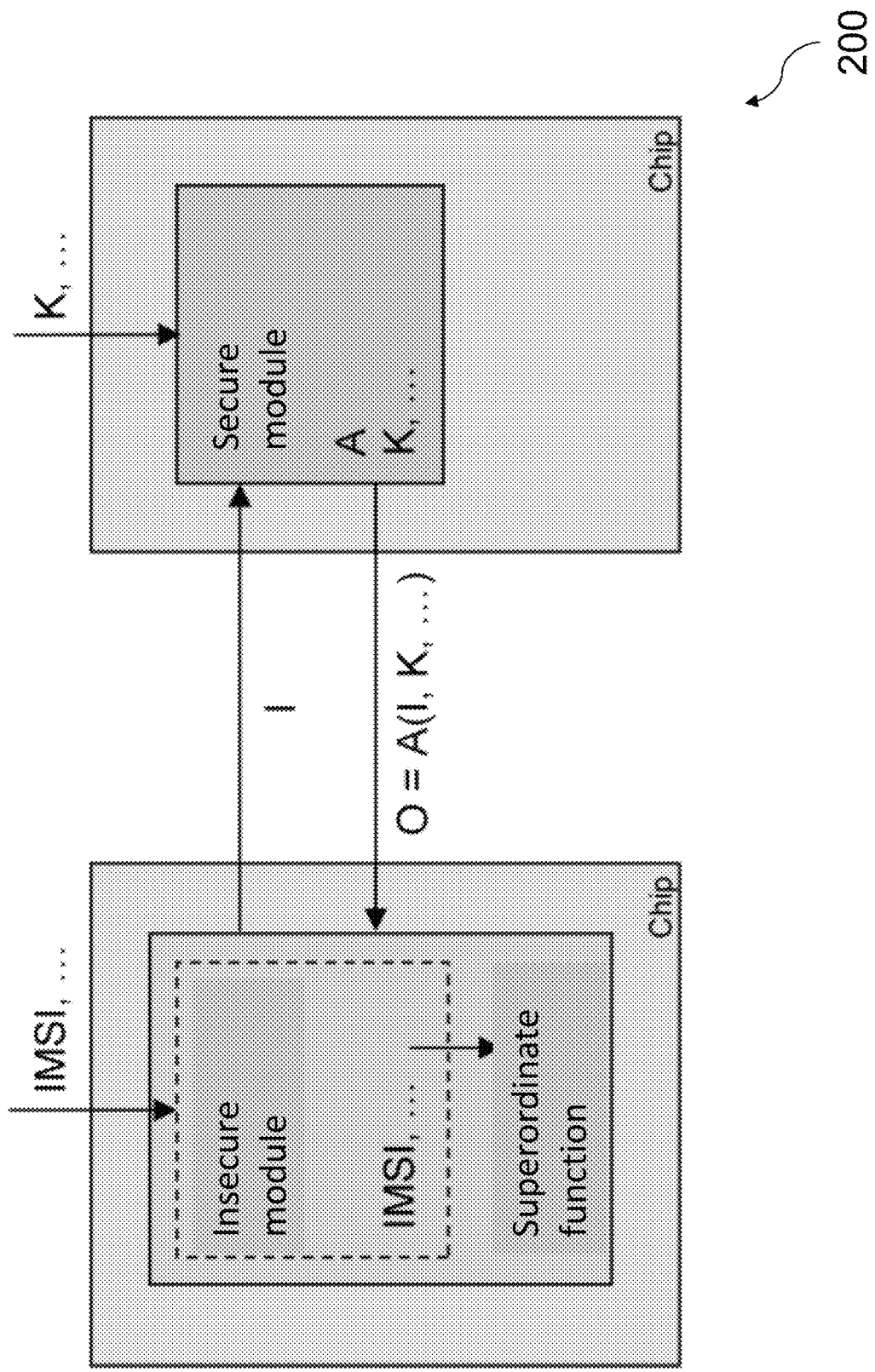
FIG. 5 is a schematic illustration of a communications device for communicating with an authentication server via a communications network.

FIG. 5 is a schematic illustration of a communications device 200 for communicating with an authentication server via a communications network. The communications device 200 shown is a possible embodiment of the communications device 200 of FIG. 2.

The communications device 200 comprises a subscriber identification system having a first circuit module 101, a second circuit module 105, and a third circuit module 201. The first circuit module 101 can be implemented as an insecure module, the second circuit module 105 can be implemented as a secure module, and the third circuit module 201 can carry out a superordinate function of the communications device 200. The subscriber ID is an international mobile subscriber identity (IMSI).

The second circuit module 105 is arranged on a separate integrated circuit (chip). The first circuit module 101 is integrated in the third circuit module 201 in the form of a superordinate function.

The first circuit module 101 is thus integrated in the third circuit module 201 in the form of a superordinate function, and the second circuit module 105 is formed as a separate integrated circuit (chip). The cryptographic key K can thus be loaded in a secure environment and the second circuit module 105 can then be input into the communications device 200 in an insecure environment.

Figure 6:
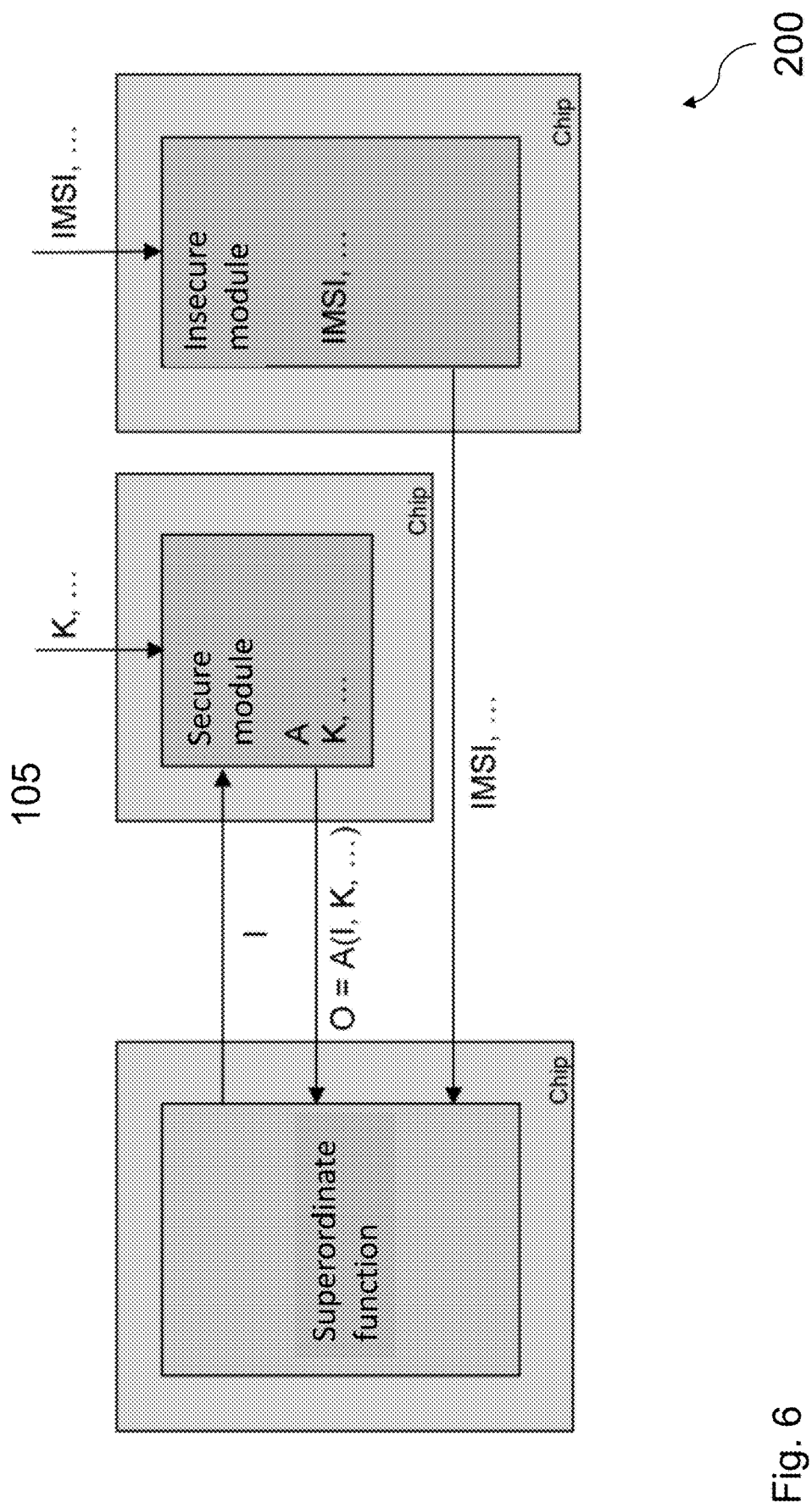
FIG. 6 is a schematic illustration of a communications device for communicating with an authentication server via a communications network.

FIG. 6 is a schematic illustration of a communications device 200 for communicating with an authentication server via a communications network. The communications device 200 shown is a possible embodiment of the communications device 200 of FIG. 2.

The communications device 200 comprises a subscriber identification system having a first circuit module 101, a second circuit module 105, and a third circuit module 201. The first circuit module 101 can be implemented as an insecure module, the second circuit module 105 can be implemented as a secure module, and the third circuit module 201 can carry out a superordinate function of the communications device 200. The subscriber ID is an international mobile subscriber identity (IMSI).

The first circuit module 101 and the second circuit module 105 are arranged on separate integrated circuits (chips). In this case, there is no integration with the third circuit module 201 in the form of a superordinate function.

As a result, the first circuit module 101 and the second circuit module 105 are formed as or integrated in separate integrated circuits (chips).

Figure 7:
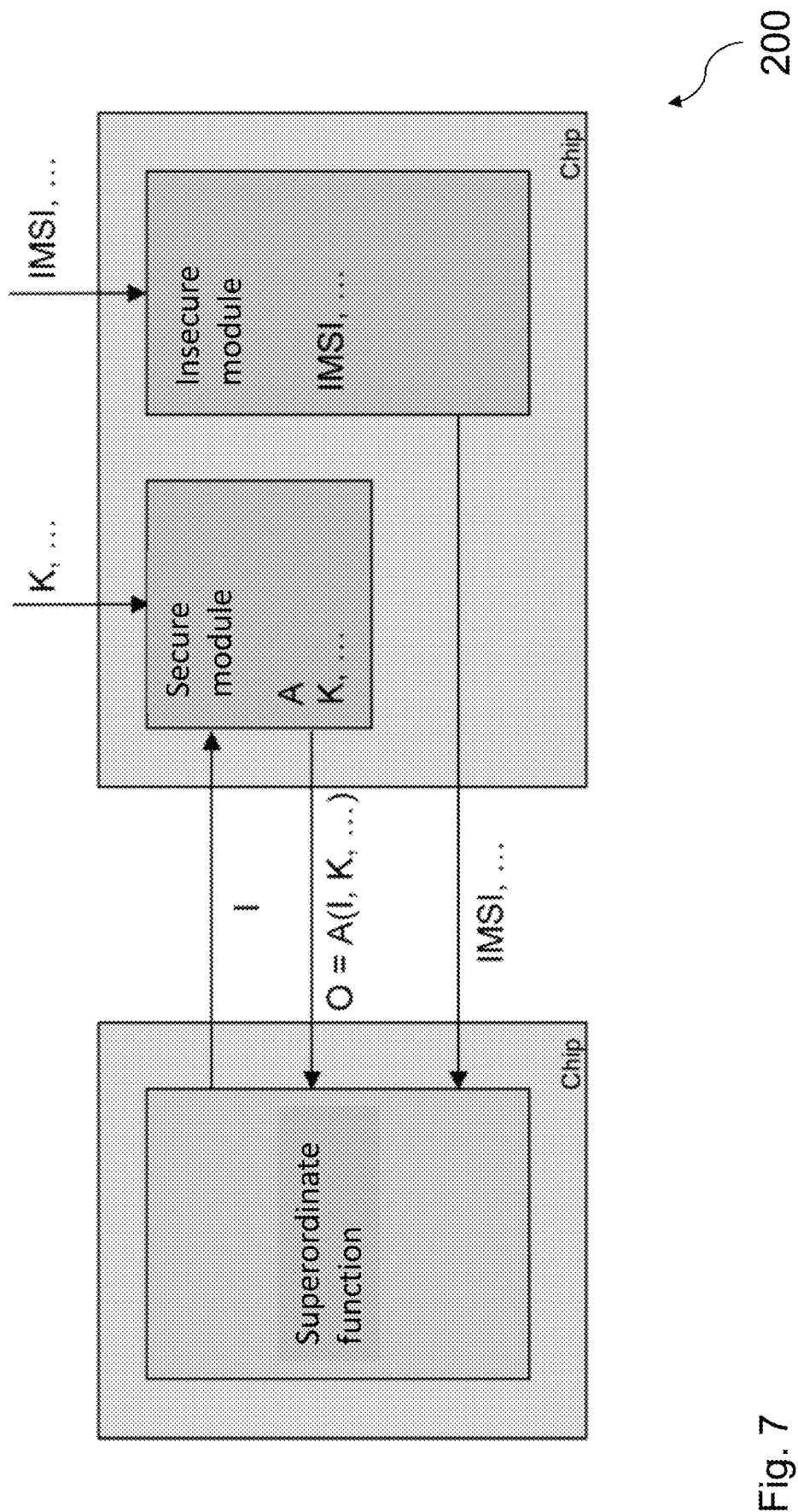
FIG. 7 is a schematic illustration of a communications device for communicating with an authentication server via a communications network.

FIG. 7 is a schematic illustration of a communications device 200 for communicating with an authentication server via a communications network. The communications device 200 shown is a possible embodiment of the communications device 200 of FIG. 2.

The communications device 200 comprises a subscriber identification system having a first circuit module 101, a second circuit module 105, and a third circuit module 201. The first circuit module 101 can be implemented as an insecure module, the second circuit module 105 can be implemented as a secure module, and the third circuit module 201 can carry out a superordinate function of the communications device 200. The subscriber ID is an international mobile subscriber identity (IMSI).

The first circuit module 101 and the second circuit module 105 are arranged on a common integrated circuit (chip). In this case, there is no integration with the third circuit module 201 in the form of a superordinate function.

As a result, the first circuit module 101 and the second circuit module 105 are contained in a common integrated circuit (chip). Therefore, an integrated circuit can be produced having a secure region and an insecure region.

Figure 8:
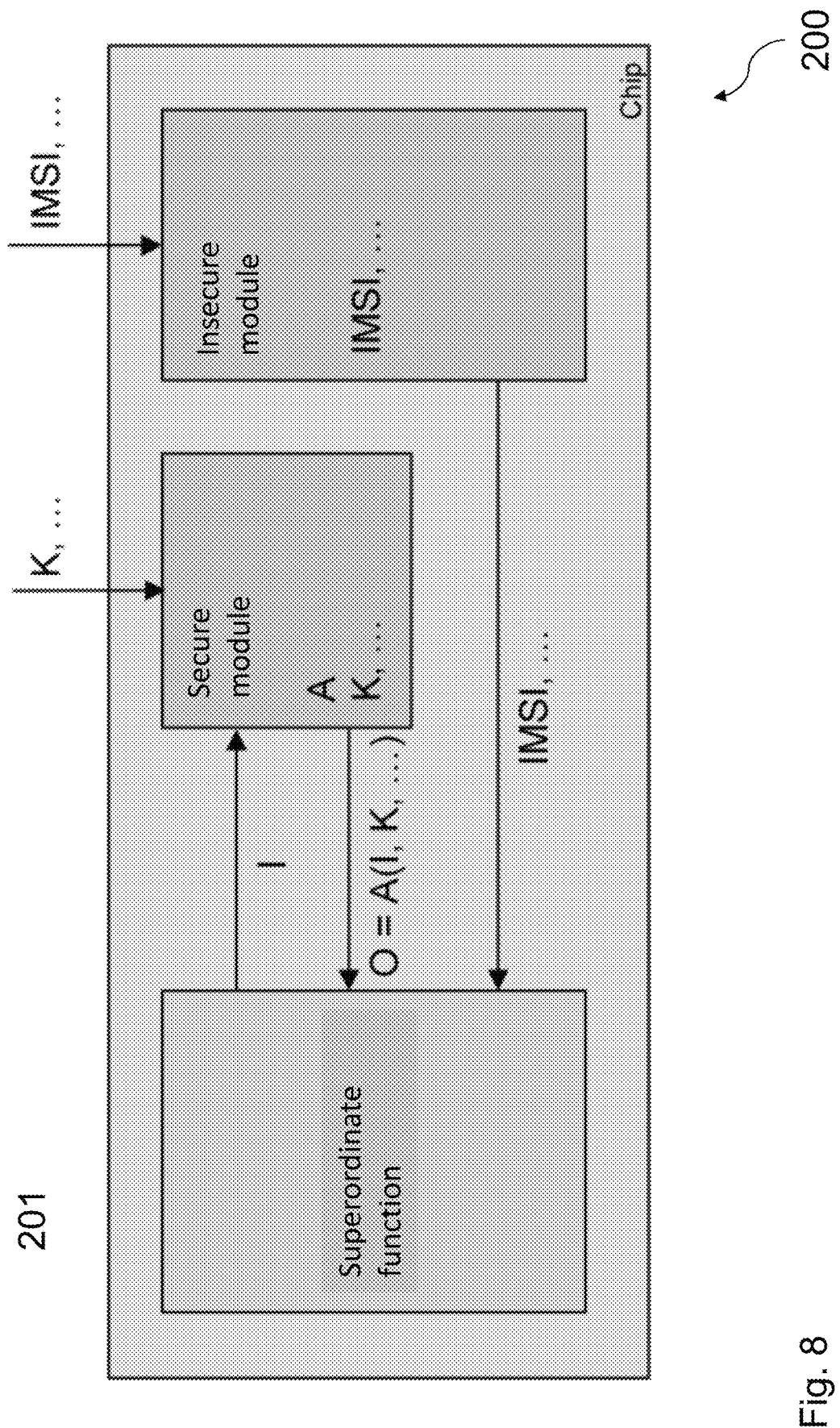
FIG. 8 is a schematic illustration of a communications device for communicating with an authentication server via a communications network.

FIG. 8 is a schematic illustration of a communications device 200 for communicating with an authentication server via a communications network. The communications device 200 shown is a possible embodiment of the communications device 200 of FIG. 2.

The communications device 200 comprises a subscriber identification system having a first circuit module 101, a second circuit module 105, and a third circuit module 201. The first circuit module 101 can be implemented as an insecure module, the second circuit module 105 can be implemented as a secure module, and the third circuit module 201 can carry out a superordinate function of the communications device 200. The subscriber ID is an international mobile subscriber identity (IMSI).

The first circuit module 101, the second circuit module 105, and the third circuit module 201 in the form of a superordinate function are arranged on a common integrated circuit (chip). In this case, there is no integration with the third circuit module 201 in the form of a superordinate function.

As a result, the first circuit module 101, the second circuit module 105, and the third circuit module 201 in the form of a superordinate function are contained in a common integrated circuit (chip). In this case, there is no functional integration.

According to one embodiment, the second circuit module 105 additionally comprises the subscriber ID or IMSI. Corresponding functions allow the algorithm A to be executed, the cryptographic key K to be written, and the subscriber ID or IMSI to be written and read.

Figure 9:
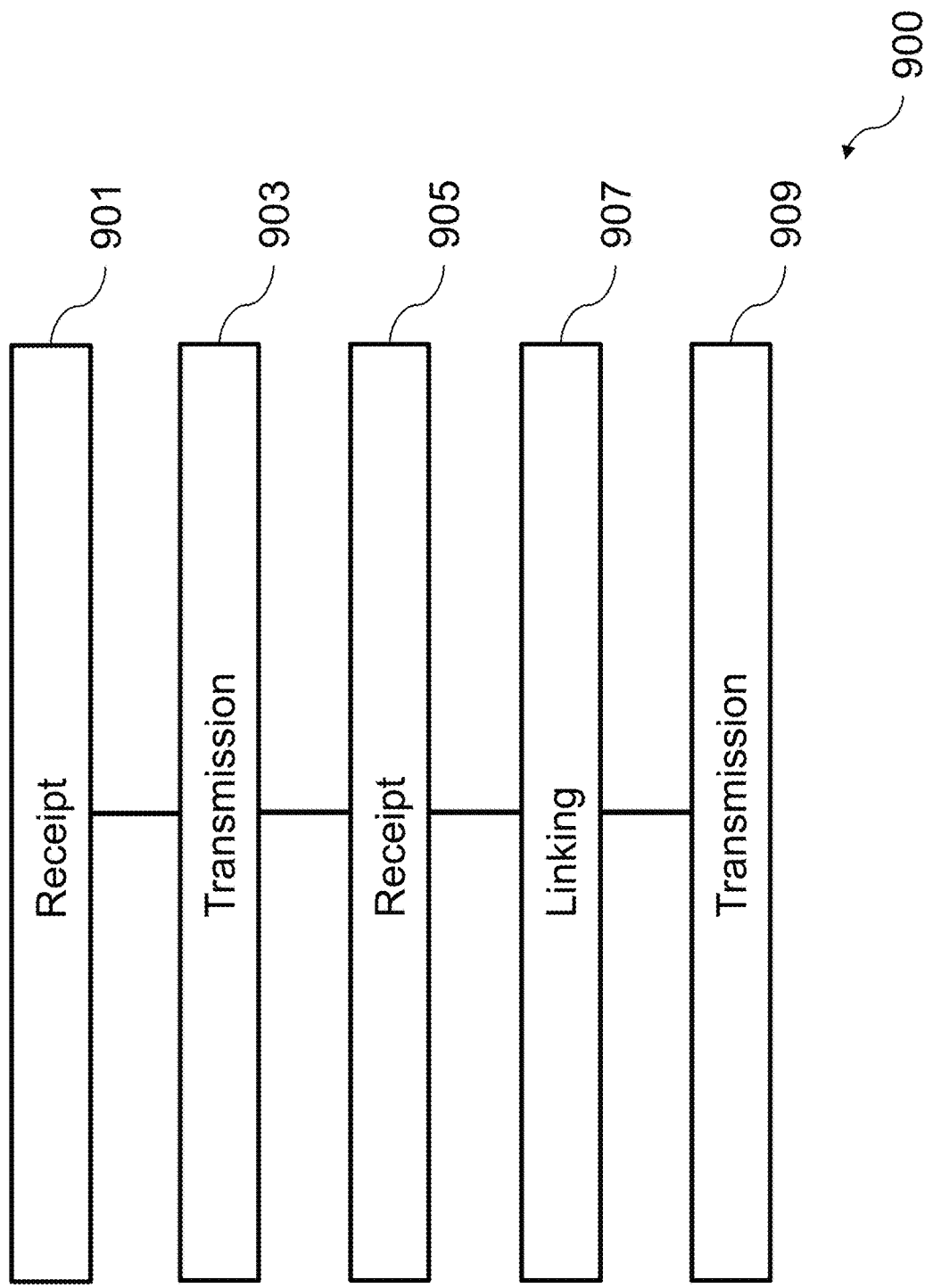
FIG. 9 is a schematic illustration of a method for identifying a subscriber in a communications network using a subscriber identification system.

FIG. 9 is a schematic illustration of a method 900 for identifying a subscriber in a communications network using a subscriber identification system. The subscriber is assigned a subscriber ID and a cryptographic key. The subscriber identification system comprises a first circuit module having a first communications interface and a second circuit module having a second communications interface, at least the subscriber ID being stored in the first circuit module, and at least the cryptographic key being stored in the second circuit module.

The method 900 comprises receiving 901 a request signal for the subscriber ID via the communications interface, transmitting 903 the subscriber ID via the first communications interface in response to receiving the request signal, receiving 905 an input parameter via the second communications interface, linking 907 the input parameter with the cryptographic key using an algorithm via the second circuit module in order to obtain an output parameter, and transmitting 909 the output parameter via the second communications interface.

Figure 10:
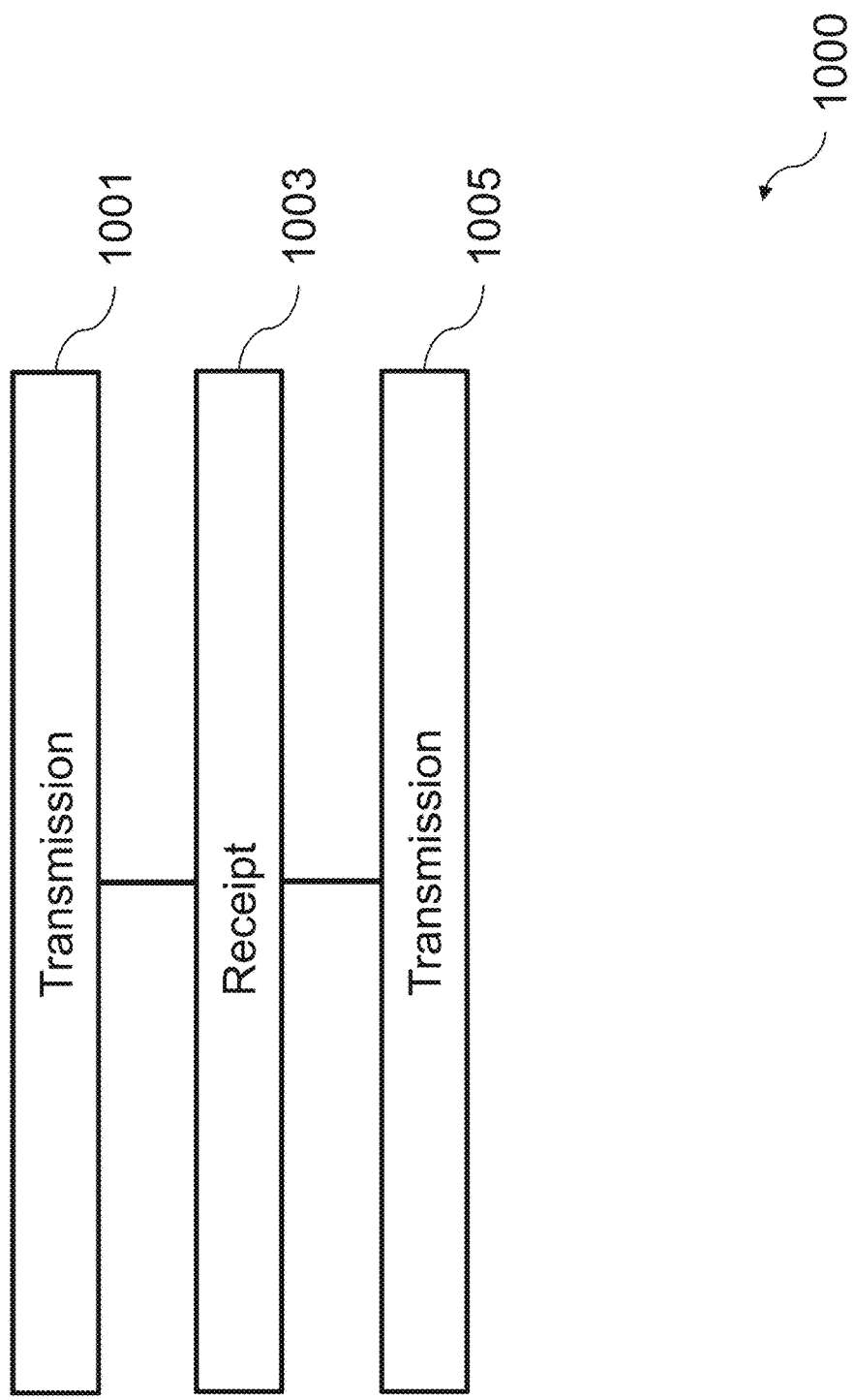
FIG. 10 is a schematic illustration of a method for communicating with an authentication server via a communications network using a communications device.

FIG. 10 is a schematic illustration of a method 1000 for communicating with an authentication server via a communications network using a communications device. The communications device comprises a subscriber identification system according to FIG. 1, a third circuit module having a third communications interface for communicating with the subscriber identification system, and a fourth communications interface for communicating with the authentication server via the communications network.

The method 1000 comprises transmitting 1001 the request signal to the subscriber identification system via the third communications interface, receiving 1003 the subscriber ID from the subscriber identification system via the third communications interface, and transmitting 1005 the received subscriber ID to the authentication server via the communications network via the fourth communications interface.

All the features disclosed or described in connection with individual embodiments of the invention can be combined in any way in the subject matter according to the invention in order to bring about their advantageous effects simultaneously.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 100 subscriber identification system
101 first circuit module
103 first communications interface
105 second circuit module
107 second communications interface
200 communications device
201 third circuit module
203 third communications interface
205 fourth communications interface
207 authentication server
209 communications network
900 method for identifying a subscriber in a communications network
901 receiving a request signal
903 transmitting the subscriber ID
905 receiving the input parameter
907 linking the input parameter with the cryptographic key
909 transmitting the output parameter
1000 method for communicating with an authentication server
1001 transmitting the request signal
1003 receiving the subscriber ID
1005 transmitting the received subscriber ID

The invention claimed is:

1. A subscriber identification system for identifying a subscriber in a communications network, wherein the subscriber is assigned a subscriber ID and a cryptographic key, the system comprising:
a first circuit module in which at least the subscriber ID is stored, wherein the first circuit module comprises a first communications interface configured to receive a request signal for the subscriber ID and to transmit the subscriber ID in response to receiving the request signal; and
a second circuit module in which at least the cryptographic key is stored, wherein the second circuit module comprises a second communications interface configured to receive an input parameter, wherein the second circuit module is configured to link the input parameter with the cryptographic key to obtain an output parameter, and wherein the second communications interface is configured to transmit the output parameter;
wherein the first circuit module is arranged on a first integrated circuit, the second circuit module is arranged on a second integrated circuit, and the first and second integrated circuits are separate integrated circuits; and
wherein the first circuit module corresponds to an insecure environment, and wherein the second circuit module corresponds to a secure environment comprising a secure cryptoprocessor.

2. The subscriber identification system according to claim 1, wherein the first circuit module comprises a first non-volatile memory, wherein at least the subscriber ID is stored in the first non-volatile memory, and wherein the second circuit module comprises a second non-volatile memory, wherein at least the cryptographic key is stored in the second non-volatile memory.

3. The subscriber identification system according to claim 1, wherein the second circuit module comprises a logic circuit, wherein the logic circuit is configured to link the input parameter with the cryptographic key.

4. The subscriber identification system according to claim 1, wherein the subscriber ID is an international mobile subscriber identity (IMSI).

5. The subscriber identification system according to claim 1, wherein the second circuit module is configured to link the input parameter with the cryptographic key using an A3/A8 algorithm, a MILENAGE algorithm or a TUAK algorithm.

6. The subscriber identification system according to claim 1, wherein the cryptographic key is stored in the second circuit module in a non-readable manner.

7. A communications device for communicating with an authentication server via a communications network, the communications device comprising:
a subscriber identification system, the subscriber identification system comprising:
a first circuit module in which at least a subscriber ID is stored, wherein the subscriber ID is assigned to a subscriber, and wherein the first circuit module comprises a first communications interface configured to receive a request signal for the subscriber ID and to transmit the subscriber ID in response to receiving the request signal; and
a second circuit module in which at least a cryptographic key is stored, wherein the cryptographic key is assigned to the subscriber, and wherein the second circuit module comprises a second communications interface configured to receive an input parameter, wherein the second circuit module is configured to link the input parameter with the cryptographic key to obtain an output parameter, and wherein the second communications interface is configured to transmit the output parameter; and
a third circuit module having a third communications interface for communicating with the subscriber identification system, and a fourth communications interface for communicating with the authentication server via the communications network;
wherein the third communications interface is configured to transmit the request signal to the subscriber identification system and to receive the subscriber ID from the subscriber identification system; and
wherein the fourth communications interface is configured to transmit the received subscriber ID to the authentication server via the communications network;
wherein the first circuit module is arranged on a first integrated circuit, the second circuit module is arranged on a second integrated circuit, and the first and second integrated circuits are separate integrated circuits; and wherein the first circuit module corresponds to an insecure environment, and wherein the second circuit module corresponds to a secure environment comprising a secure cryptoprocessor.

8. The communications device according to claim 7, wherein the fourth communications interface is further configured to receive the input parameter from the authentication server via the communications network, wherein the third communications interface is further configured to transmit the input parameter to the subscriber identification system and to receive the output parameter from the subscriber identification system, and wherein the fourth communications interface is further configured to transmit the output parameter to the authentication server via the communications network.

9. The communications device according to claim 7, wherein the third circuit module comprises the first circuit module of the subscriber identification system and/or the second circuit module of the subscriber identification system.

10. The communications device according to claim 7, wherein the third circuit module is arranged in a third integrated circuit.

11. A method for identifying a subscriber in a communications network using a subscriber identification system, the method comprising:
    receiving, by a first circuit module of a first integrated circuit of the subscriber identification system, a request signal for a subscriber ID assigned to the subscriber via a first communications interface of the first circuit module, wherein the first circuit module corresponds to an insecure environment;
    transmitting, by the first circuit module of the subscriber identification system, the subscriber ID via the first communications interface in response to receiving the request signal;
    receiving, by a second circuit module of a second integrated circuit of the subscriber identification system, an input parameter via a second communications interface of the second circuit module, wherein the second circuit module is separate from the first integrated circuit and corresponds to a secure environment comprising a secure cryptoprocessor;
    linking, by the second circuit module of the subscriber identification system, the input parameter with the cryptographic key to obtain an output parameter; and
    transmitting, by the second circuit module of the subscriber identification system, the output parameter via the second communications interface.

12. The method according to claim 11, wherein the request signal is received by the subscriber identification system from a third circuit module;
    wherein the subscriber ID is transmitted by the subscriber identification system to the third circuit module via a third communications interface; and
    wherein the subscriber ID is further transmitted to an authentication server via a communications network via a fourth communications interface.

13. One or more non-transitory computer-readable mediums having processor-executable instructions stored thereon for identifying a subscriber in a communications network using a subscriber identification system, wherein the processor-executable instructions, when executed, facilitate performance of the following:
    receiving, by a first circuit module of a first integrated circuit of the subscriber identification system, a request signal for a subscriber ID assigned to the subscriber via a first communications interface of the first circuit module, wherein the first circuit module corresponds to an insecure environment;
    transmitting, by the first circuit module of the subscriber identification system, the subscriber ID via the first communications interface in response to receiving the request signal;
    receiving, by a second circuit module of a second integrated circuit of the subscriber identification system, an input parameter via a second communications interface of the second circuit module, wherein the second circuit module is separate from the first integrated circuit and corresponds to a secure environment comprising a secure cryptoprocessor;
    linking, by the second circuit module of the subscriber identification system, the input parameter with the cryptographic key to obtain an output parameter; and
    transmitting, by the second circuit module of the subscriber identification system, the output parameter via the second communications interface.

* * * * *